Aug. 17, 1965  A. B. BASSOFF  3,200,504
PANTOGRAPH TYPE PROFILE CHECKER
Filed May 7, 1962
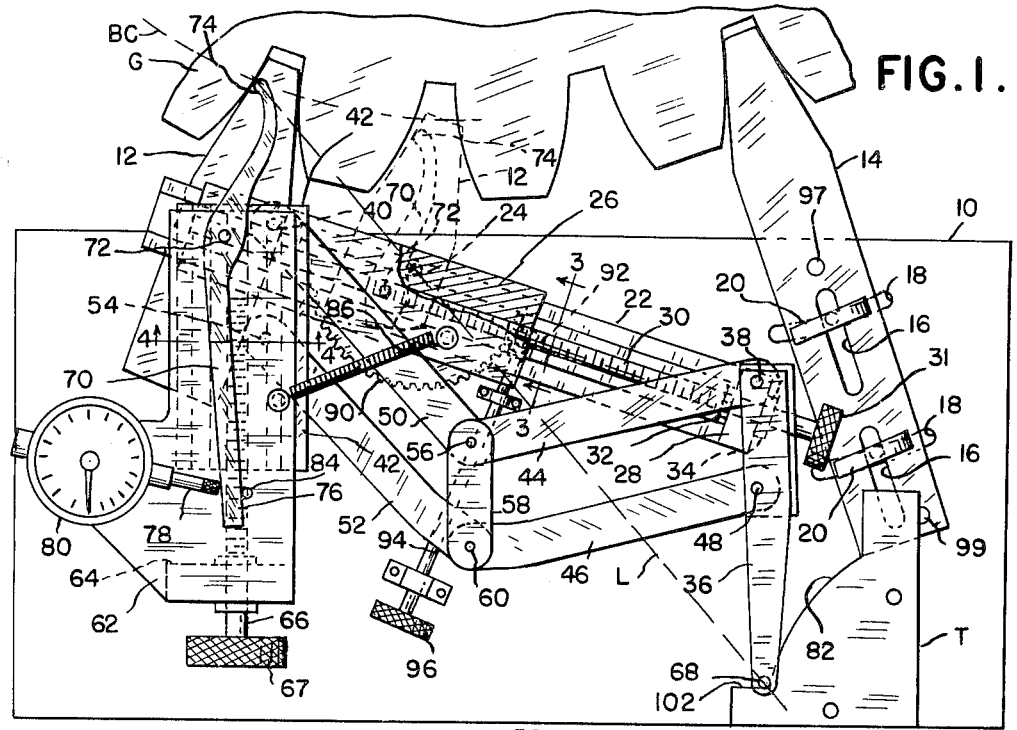
INVENTOR.
ARTHUR B. BASSOFF
BY Whittemore,
Hulbert & Belknap
ATTORNEYS 3,200,504
PANTOGRAPH TYPE PROFILE CHECKER
Arthur B. Bassoff, Detroit, Mich., assignor to National
Broach & Machine Company, Detroit, Mich., a corporation of Michigan
Filed May 7, 1962, Ser. No. 192,717
18 Claims. (Cl. 33—179.5)

The present invention relates to an improved pantograph, and more particularly to a special application of the improved pantograph as a device for checking gear tooth surfaces such as involute surfaces.

It is an object of the present invention to provide a pantograph having a novel adjustable parallel linkage.

It is a further object of the present invention to provide a pantograph having an adjustable parallel linkage comprising parallel bars pivoted to a first bar and maintained in parallel relationship to each other by parallel linkage interconnecting said parallel bars.

It is a further object of the present invention to provide a pantograph type gear checker capable of checking involutes of base circles of substantially the full practical range of sizes using for this purpose a single involute template.

It is a further object of the present invention to provide a pantograph type checker intended primarily for the purpose of checking the involutes of relatively large gears as for example, gears having a pitch diameter of 36" or more, including means for mounting the gear checker to the toothed profile of the gear.

It is a further object of the present invention to provide a gear checker as described in the preceding paragraph in which the mounting means comprises a pair of relatively adjustable tooth-like mounting elements adapted to be tightly engaged in the tooth spaces of the work gear.

Other objects and features of the invention will become apparent as the description proceeds, especially when taken in conjunction with the accompanying drawing, illustrating a preferred embodiment of the invention, wherein:

FIGURE 1 is a plan view of the involute gear checker with parts broken away.

FIGURE 2 is a side elevational view of the gear checker shown in FIGURE 1.

FIGURE 3 is a fragmentary sectional view on the line 3—3, FIGURE 1.

FIGURE 4 is a fragmentary sectional view on the line 4—4, FIGURE 1.

FIGURE 5 is a fragmentary view illustrating adjustment of the locating element.

Referring now to the drawings, the gear checker is illustrated as assembled in exactly predetermined position relative to a work gear G. For this purpose the checker comprises a support plate 10 having a toothed element 12 rigidly fixed thereto, and a second tooth element 14 adjustably secured thereto. Adjustment of the toothed element 14 relative to the plate 10 is accomplished by providing a pair of elongated slots 16 on the toothed element 14, and a pair of arcuate slots 18 in the mounting plate 10 through which fastening elements such as screws 20 extend. The screws of course are provided with nuts at the underside of the plate as seen in FIGURE 1. By this arrangement the position of the toothed element 14 may be properly adjusted to be received in a tooth space of the gear G so as to position the mounting plate 10 in the exactly required position.

The gear checking device includes a pantograph including the equivalent of the usual parallelogram linkage characteristics of pantographs. In this case however, one bar of the linkage is omitted and in place thereof, two opposite parallel bars thereof are interconnected by a parallel linkage which permits adjustment of the pantograph by simplified means.

The pantograph comprises a base bar 22 which is connected to the base plate 10 by a fixed pivot mounting 24. Connected to the base bar 22 for longitudinal adjustment thereon is a base adjustment slide 26. At the right end as seen in FIGURE 1, the base bar 22 is provided with an upstanding flange 28 to which is rotatably mounted an adjusting screw 30 having a knurled knob 31 and held against longitudinal adjustments by collars 32 and 34, and threaded into the base adjustment slide 26.

The base bar 22 has a bar 36 pivoted thereto as indicated at 38. The base adjustment slide 26 has a bar 42 pivoted thereto as indicated at 40. The bar 42 and the bar 36 are opposite parallel bars of the pantograph unit, the base bar 22 and the base adjustment slide 26 constituting an adjustable base bar assembly on which the parallel bars 36 and 42 are mounted.

In the usual pantograph the parallel end bars 36 and 42 are conventionally interconnected by a fourth rigid bar, thus providing a parallelogram in which opposite sides are at all times maintained in parallelism. However, in the present pantograph the parallel bars 36 and 42 are connected by a special parallel linkage which permits adjustment of the effective length of the base by simple means while at all times maintaining parallel bars 36 and 42 in parallelism. This parallel linkage comprises a first pair of parallel links 44 and 46. The link 44 may conveniently be pivoted to the base bar 22 by the same pin or pivot means 38 which connects the bar 36 thereto. The link 46 is connected to the bar 36 by a pivot connection 48. Similarly, link 50 may conveniently be pivoted to the base adjustment slide 26 by the pivot connection or pin 40 which serves as the pivot mounting between the bar 42 and the base adjustment slide 26. The parallel link 52 is connected by a pivot connection or pin 54 to the bar 42. It will be observed that the distance between pivot connections 38 and 48 is equal to the distance between the pivot connections 40 and 54. The inner ends of the links 44 and 50 are interconnected by a pivot connection 56 which also serves as a pivot connection for a rigid link 58. The opposite end of the link 58 and the adjacent ends of the links 46 and 52 are interconnected by a pivot connection or pin 60. The distance between the pivot connections 56 and 60 is of course equal to the distance between pivot connections 38 and 48, and hence, also equal to the distance between the pivot connections 40 and 54. Accordingly, links 44, 46, 50, 52 and 58 constitute a parallel linkage which is effective to maintain the pantograph bars 36 and 42 always in parallelism.

Mounted on the pantograph bar 42 is a follower slide 62, the slide having a depending flange 64 which supports a threaded rotatable adjusting screw 66 having a knurled knob 67 thereon, and holds it against longitudinal movement. The screw 66 engages in a threaded recess in the bar 42 and hence, serves as means for effecting a carefully controlled adjustment of the follower slide 62 longitudinally of the parallel bar 42 of the pantograph.

Follower elements are carried by the pantograph, and specifically, one of these constitutes a pin or follower 68 carried by the bar 36 and the other constitutes the lever 70 which is pivoted to the follower slide 62, as indicated at 72. The lever 70 includes one arm terminating in a contact finger 74 which is adapted to be moved along the flank of a tooth of the gear G. The lever 70 includes another arm 76 which engages the plunger 78 of an indicator 80.

Fixed to the support plate 10 is a template T, the active surface of which as indicated at 82 is an involute surface.

As usual, the plunger 78 of the indicator 80 is spring biased outwardly and will maintain the contact portion 74 of the lever 70 against the profile of a tooth of the gear G. In one limiting position, the arm 76 of the lever 70 engages a pin 84 mounted on the follower slide 62. In addition, a tension spring 86 is connected intermediate the base adjustment slide 26 and the parallel bar 42 or the follower slide 62 to bias the pantograph mechanism in a direction which maintains the follower pin 68 in engagement with the surface 82 of the template T and also maintains the contact portion 74 of the lever 70 in engagement with the surface of a tooth of the gear G.

It will be observed that the contact element formed by the pin 68, the contact portion 74 of the lever 70, and the main or fixed pivot 24 of the pantograph, occupy a straight line, the location of which is designated L. Accordingly, if it is assumed that the active surface 82 of the template T is an involute, the contact portion 74 of the lever 70 will follow an involute path unless it is forced to rock about its pivot mounting 72 by involute errors in the surface of the tooth of the gear G. Moreover, accuracy is imparted to the measurement due to the fact that the template T may have its involute surface on a much larger scale than the involute of the gear tooth. It will of course be understood that the template T is properly positioned on the support plate 10 so as to be located in properly oriented position with respect to the surface of the gear tooth being checked.

In order to move the follower 68 over the surface 82 of the template T, the base bar 22 is provided with a circular rack portion 90 which is engaged by a worm 92 carried by a shaft 94 supported on the plate 10. The shaft 94 includes a knurled knob 96 and rotation of the shaft results in accurately controlled swinging movement of the pantograph assembly about its stationary pivot 24.

Since the ratio between the size or base circle of the involute surface 82 and the involute of the gear G is determined by the ratio of the distances between main pivot 24 and the contact points of the pin 68 and follower portion 74 respectively, it will be apparent that adjustment as to ratio is permitted by rotation of the two knobs 31 and 67. If the knob 31 is rotated in a direction to cause the base adjustment slide 26 to move upwardly and to the left along the base bar 22, it will be apparent that follower 74 moves to a position below line L. For accurate pantographic action it is essential that the follower portion 74 remains on the line L. Accordingly, the follower portion 74 may be brought back to the line L by appropriate rotation of the knob 67. The adjustment effected by the knob 31 is equivalent to elongating the opposed bars of a conventional four-bar pantograph, but separate adjustment of such opposed bars is not required due to the substitution of the parallel linkage 32, 46, 50 and 52 for one of such bars. It will also be apparent that the adjustment, since it is accomplished in both instances by the use of relatively rotatable screw and nut devices, permits adjustment into exactly predetermined relationship and that after such adjustments the parts will remain in adjusted position without requiring special clamping or locking means.

A very valuable result obtained by the use of the present construction as an involute checker is that a single template T may be employed for checking teeth of gears of all practical pitch diameters.

A second extremely valuable result obtained by the use of the present invention is that the relatively small involute checker may be used as an attachment for a checking device intended primarily for the checking of relatively large gears such for example as gears having 180″ pitch diameter. In this case it becomes impractical to provide involute checking devices operating off base rolls or portions thereof having a diameter equal to the diameter of the base circle of the gear. It also becomes impractical to provide a mounting for the involute checker on the same structure supporting the work gear except as this mounting may be located by reference to gear teeth of the gear being checked. In the present instance the relatively small involute checker is positioned adjacent the periphery of a large gear and is located in exactly predetermined position relative thereto by means of the toothed elements 12 and 14. It will of course be appreciated that if the gear G is helical, the toothed elements 12 and 14 have correspondingly inclined tooth portions to fit in the tooth spaces and at the same time to maintain the plane of the support plate 10 parallel to the plane of the gear G.

While the present invention has been illustrated and described in detail in conjunction with an involute surface checker or comparator, it will of course be appreciated that the pantograph mechanism, particularly characterized by the substitution of the collapsible parallel linkage 44, 46, 50 and 52, for the fourth bar of the usual four-bar pantograph, is capable of use wherever an adjustable pantograph is desired.

The template T is located on the support plate 10 in a fixed position and the pivot mounting 24 which connects the base bar 22 to the plate 10 is of course also in a fixed position. Accordingly, the adjustment as to ratio accomplished by turning the knobs 31 and 67 has the effect of moving the contact finger 74 of the lever 70 along the line L toward and away from the axis of the pivot mounting 24. As the contact portion or finger 74 approaches the pivot mounting 24, the ratio of the size of the involute traced by the contact portion 74 to the size of the involute 82 of the template is reduced and the parts are arranged so that the contact portion 74 may be brought into extremely close proximity to the pivot mounting 24.

When adjusting slide 26 for a reduced ratio so that the finger 74 is in the dotted line position shown in FIGURE 1, the locating element 12 will of course have to be moved so as to enter the same tooth space in which the contact portion or finger 74 is entered. For this purpose the plate 10 is provided with elongated slots 100 which extend parallel to the straight line joining the axes of pivot connections 40, 24 and 38 when the base bar 22 is in a reference position in which the follower element 68 engages the involute template at its origin or at its point of departure from the imaginary base circle. At this time it will of course be essential to have the gear checking device so adjusted that the contact portion 74 of the lever 70 engages the involute of the gear tooth being checked at the base circle which is designated, for the full line position of the parts seen in FIGURE 1, at BC.

In order for the operator to be sure that the parts are properly adjusted, the involute template T is provided with a shoulder 102 against which the follower 68 engages. Locating element 12 is provided with suitable clamping means indicated at 104, arranged in pairs in each of the slots 100. The clamping means 104 may be in the form of bolts having intermediate portions extending through the slots 100 and guiding movement of the locating element 12 in parallelism thereon. After adjustment to the exactly required position, the clamping means are tightened to lock the locating element 12 in adjusted position.

The accuracy of the involute check made by the present instrument is of course dependent on accuracy of setting of the checker relative to the gear G and this in turn requires accurate setting of the adjustable tooth or locating element 14. The proper setting of the element 14 can be computed and the actual setting can be made by providing gauge pins 97 and 99 on the adjustable locating element 14 and the location of the element 14 can be determined by gauging the location of the pins relative to the edges of the plate 10.

The drawing and the foregoing specification constitute a description of the improved pantograph type profile checker in such full, clear, concise and exact terms as to enable any person skilled in the art to practice the invention, the scope of which is indicated by the appended claims.

What I claim as my invention:

1. A pantograph comprising a support, a base bar, a pivot mounting connecting said base bar to said support, a base adjustment slide movable longitudinally of said base bar, a pair of parallel bars pivoted respectively to said base bar and said base adjustment slide, a first pair of parallel links pivoted to one of said pair of parallel bars, a second pair of parallel links pivoted to the other of said parallel bars, a rigid link interconnecting said first and second pairs of links in position to maintain parallelism thereof, and means for effecting adjustment of said base adjustment slide on said base bar.

2. A pantograph as defined in claim 1 in which the axis of the pivot connection of one of the links of each pair of parallel links to the base bar and base adjustment slide is coincident with the axis of the pivot connection of the parallel bars thereto.

3. A pantograph as defined in claim 1 in which the means for adjusting said base adjustment slide relative to said base bar comprises a screw and nut connection therebetween.

4. A pantograph as defined in claim 1 which comprises a follower slide adjustable longitudinally of one of said parallel bars.

5. A pantograph as defined in claim 1 which comprises a follower slide adjustable longitudinally of one of said parallel bars, and screw and nut adjusting means connected between said follower slide and the parallel bar on which it is adjustable.

6. A pantograph as defined in claim 1 which comprises a follower slide adjustable longitudinally of one of said parallel bars, and screw and nut adjusting means connected between said follower slide and the parallel bar on which it is adjustable, and in which the means for adjusting said base adjustment slide relative to said base bar comprises a screw and nut connection therebetween.

7. A pantograph as defined in claim 1 which comprises a follower slide adjustable longitudinally of one of said parallel bars in a direction parallel to the plane containing the axes of the pivot connections between said one parallel bar and the pair of parallel links connected thereto.

8. A pantograph as defined in claim 7, a follower element pivoted to said follower slide, and indicating means operatively connected to said element.

9. An involute checker for large gears comprising a support having locating means thereon engageable with tooth spaces of a gear to be checked, an adjustable base bar assembly pivoted to said support, means for adjusting the effective length of said base bar assembly, a pair of parallel bars pivoted to portions of said base bar assembly whose spacing varies upon a change in effective length of said base bar assembly, and extensible parallel linkage interconnecting said parallel bars and effective to maintain said bars in parallelism during changes in length of said base bar assembly and during swinging of said parallel bars, a follower slide adjustable longitudinally of one of said parallel bars, a follower element on said follower slide, a second follower element on the other of said parallel bars, a template on said support engageable by one of said elements, and means for measuring movement of said other element relative to the member on which it is mounted.

10. A checker as defined in claim 9 in which the base bar assembly comprises a base bar, a base adjustment slide slidable longitudinally of said base bar, and means for effecting continuous adjustment of said slide on said base bar.

11. A checker as defined in claim 9 which comprises a toothed circular segment fixed to said base bar assembly concentric with the pivot mounting of said assembly, and an operating worm in mesh therewith and carried in fixed position on said support.

12. A checker as defined in claim 9 in which said support comprises a plate and said locating means comprises a first tapered tooth fixed to said plate, a second tapered tooth connected to said plate for universal adjustment thereon in the plane of said plate, each of said teeth being engageable tangentially with tooth surfaces at opposite sides of the tooth space in which it is received.

13. A checker as defined in claim 12, said adjustable tooth being elongated and having a pair of longitudinally extending slots therein, said plate having a pair of slots positioned to intersect and extend transversely of the slots in said adjustable tooth, and clamping means extending through said intersecting slots.

14. An involute checker for large gears comprising a support, an involute template fixed to said support, a pantograph base bar, a fixed pivot mounting on said support connecting said bar to said support, a base adjustment slide carried by said base bar for adjustment longitudinally thereof, a pair of parallel pantograph bars, one of said parallel bars being pivoted to said base bar and having a follower carried thereby in position to move along the involute surface of said template upon swinging movement of said base bar, the other of said parallel bars being pivoted to said base adjustment slide, parallel linkage connecting said parallel bars to maintain parallelism therebetween, a follower slide adjustable longitudinally of said other parallel bar, a movable follower carried by said follower slide, and means for measuring movement of said moveable follower relative to said follower slide.

15. A checker as defined in claim 14 which comprises threaded adjusting means connected between said base bar and base adjustment slide, and threaded adjusting means connected between said follower slide and the pantograph bar on which it is slidable.

16. A tracing pantograph comprising a base, an adjustable pantograph carried by said base comprising base bar means adjustable in length and pivoted to said base, said base bar means comprising a pair of elongated aligned members interconnected for relative adjustment solely in a direction parallel to the longitudinal axes thereof, means for effecting continuous relative adjustment of said members, parallel bars pivoted to opposite end portions of said members by single pivot means to provide for free swinging of said parallel bars relative to said base bar means, and automatic means interconnecting said parallel bars operable during approach and separation between said parallel bars as a result of changes in length of said base bar means and during relative swinging between said base bar means and said base and between said parallel bars and said base bar means to maintain said parallel bars in parallelism.

17. A pantograph as defined in claim 16 in which said automatic means comprises parallel linkages connecting said parallel bars.

18. A tooth profile checker for large gears comprising a base, mounting means on said base engageable with tooth surfaces of a gear to be checked to fix said base in predetermined position relative to the gear, a pantograph having a base bar assembly pivoted to said base, said base bar assembly comprising a base bar and a base adjustment slide movable longitudinally on said base bar, means for effecting a continuous adjustment of said slide on said base bar, a pair of parallel bars pivoted respectively to said base bar and slide, extensible parallel linkage connected between said parallel bars and operable automatically to maintain said parallel bars in parallelism during adjustment of said slide on said base bar and during swinging movement of said parallel bars relative to said base bar assembly, an element on one of said parallel bars, means on said base for guiding said element in a path geometrically similar to a tooth profile to be checked and a follower on the other of said parallel bars movable over a tooth profile of the gear being checked.

References Cited by the Examiner

UNITED STATES PATENTS

| | | | |
|---|---|---|---|
| 1,562,859 | 11/25 | Anderson | 33—25 |
| 2,351,769 | 6/44 | Kramer | 33—25 |
| 2,466,241 | 4/49 | Johnson | 33—25 |
| 2,657,469 | 11/53 | Brown | 33—179.56 |
| 2,787,060 | 4/57 | Flair | 33—179.56 |
| 2,883,759 | 4/59 | Einbinder | 33—192 X |

FOREIGN PATENTS 691,734   5/53   Great Britain.

ISAAC LISANN, *Primary Examiner.*

LEONARD FORMAN, *Examiner.*